United States Patent [19]

Geiger

[11] Patent Number: 5,139,568
[45] Date of Patent: Aug. 18, 1992

[54] CONTINUOUS PRODUCTION OF IRON-CARBON ALLOY USING IRON CARBIDE

[75] Inventor: Gordon W. Geiger, Minneapolis, Minn.

[73] Assignee: Cargill, Incorporated, Minneapolis, Minn.

[21] Appl. No.: 768,781

[22] Filed: Oct. 3, 1991

[51] Int. Cl.$^5$ ............................................. C21C 7/00
[52] U.S. Cl. ........................................ 75/501; 75/512
[58] Field of Search .................... 75/512, 501; 266/215

[56] References Cited

U.S. PATENT DOCUMENTS

| Re. 32,247 | 9/1986 | Stephens, Jr. | 423/148 |
|---|---|---|---|
| 2,978,318 | 4/1961 | Kalling et al. | 75/43 |
| 3,356,488 | 12/1967 | Walsh | 75/34 |
| 3,932,172 | 1/1976 | Knuppel et al. | 75/60 |
| 3,941,587 | 3/1976 | Queneau et al. | 75/72 |
| 3,988,148 | 10/1976 | Queneau et al. | 75/74 |
| 4,053,301 | 10/1977 | Stephens, Jr. | 423/148 |
| 4,085,923 | 4/1978 | Queneau et al. | 266/215 |
| 4,327,540 | 2/1983 | Queneau et al. | 266/171 |
| 4,456,476 | 6/1984 | Sherwood | 75/512 |

OTHER PUBLICATIONS

Kalling and Johansson, "Stora's Kal-do Rotary Oxygen Steelmaking Process", *Blast Furnace and Steel Plant*, Feb. 1957, pp. 200-203.

Queneau and Schuhmann, "The Q-S Oxygen Process", *Journal of Metals*, vol. 26, No. 8, Aug. 1974, pp. 14-16.
Queneau, "The QSL Reactor for Lead and Its Prospects for Ni, Cu, and Fe", *Journal of Metals*, Dec. 1989, pp. 30-35.

Primary Examiner—Peter D. Rosenberg
Attorney, Agent, or Firm—Merchant, Gould, Smith, Edell, Welter & Schmidt

[57] ABSTRACT

A process for the continuous production of an iron-carbon alloy utilizing an enclosed reactor (10) capable of limiting the ingress and egress of atmospheric gases and gas reaction products respectively. A solid mineral material (20) containing iron carbide and at least trace amounts of iron oxide, and having a weight ratio of at least about 2:1 or greater, is fed into a molten bath (12) of metallic material in the reactor (10). The molten metallic material is simultaneously reacted with oxygen at a temperature sufficient to generate carbon monoxide as a reaction product. The oxygen is preferably injected into the molten metallic material to facilitate the reaction of the oxygen with carbon from the iron carbide to form the carbon monoxide. The carbon monoxide subsequently enters a vapor space (17) of the reactor (10) above the molten bath (12), and further reacts with oxygen to generate carbon dioxide and heat. Products of the described method are also disclosed including a continuous supply of molten iron-carbon alloy. The system or equipment utilized in the present process is also disclosed.

30 Claims, 7 Drawing Sheets

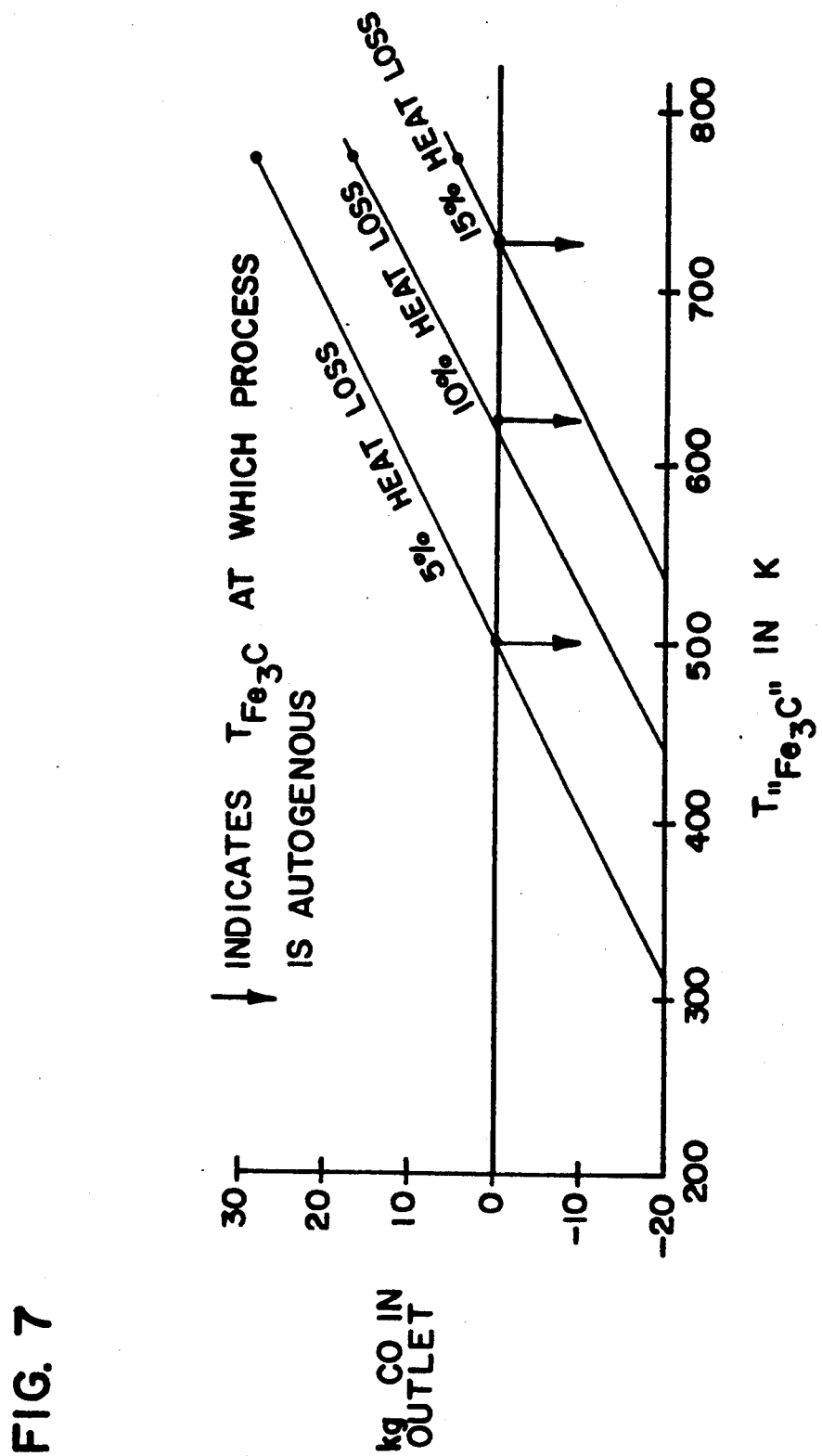

CONTINUOUS PRODUCTION OF IRON-CARBON ALLOY USING IRON CARBIDE

BACKGROUND OF THE INVENTION

1. Field of the Invention

The present invention relates to processes for the continuous production of iron-carbon alloys in the field of the pyrometallurgy of ferrous metals.

2. Description of the Prior Art

Processes for converting iron ore to steel in batch operations are well known. The iron ore is first reduced to pig iron, in a blast furnace, which is then fed, along with scrap iron or steel, to a basic oxygen furnace or an electric furnace in a batch operation. Historically, these processes have used large amounts of energy. They have also been associated with environmental problems resulting from emissions from the processing facilities. Efforts to reduce production costs have been directed toward both of these problems. First, the reduction of expenditures associated with energy consumption and second, the reduction of expenditures as a result of improvements in the handling or minimization of environmental contaminants.

Stephens (U.S. Pat. No. RE 32,247) discloses a process for the production of iron carbide from iron ore utilizing a fluid bed process which eliminates the need for a blast furnace. The iron carbide product is then fed into either a basic oxygen furnace or an electric furnace in a batch process. However, there is no teaching of the use of the iron carbide as a feed for a continuous process to produce iron-carbon alloys.

The prior art batch processes utilizing either the basic oxygen furnace or the electric furnace are open to the atmosphere. The need for capturing and treating the gases and other emissions which are emitted from these open air processes have necessitated the installation of advanced emission control equipment. This equipment must be sized not only to treat emissions coming from the batch processes themselves, but also large volumes of air which are drawn into the equipment from the surrounding environment. This greatly increases the capital costs required to build and support batch processing steel-making facilities.

Queneau et al. (U.S. Pat. No. 4,085,923) disclose an apparatus for continuously processing non-ferrous metal ores containing significant amounts of sulfur in an enclosed reactor. This system addresses the need to contain environmentally hazardous reaction product off-gases such as sulfur dioxide and the like. Queneau et al. suggest that this system could be used for the direct production of steel from iron oxide ores. However, it is believed that the need to add large quantities of carbon fuel to the reactor in order to fully reduce the iron oxides has limited the interest in the development and use of such a process. It is further believed that the Queneau-Schuhmann (Q-S) reactor disclosed by Queneau et al. has never been successfully used for such a reaction. This is because of the apparent difficulty of adding enough heat into such a continuous reactor to complete the iron oxide reduction process. Furthermore, if coal is used as a carbon fuel to generate heat, the coal would be likely to introduce sulfur into the system, which would then necessitate the use of the costly emission control equipment previously mentioned and introduce sulfur into the metallic product.

Accordingly, a need exists for a continuous iron-carbon alloy manufacturing process utilizing an enclosed reactor. The present invention addresses this need as well as other problems associated with the production of iron-carbon alloys. The present invention also offers further advantages over the prior art, and solves other problems associated therewith.

SUMMARY OF THE INVENTION

The present invention provides a continuous process for the production of iron-carbon alloys in an energy efficient and environmentally progressive process. This process includes the step of providing an enclosed reactor for receiving and reacting mineral and/or metallic material in a continuous process, wherein the enclosed reactor includes a molten bath of metallic material and is capable of limiting the ingress and egress of atmospheric gases and gaseous reaction products, respectively. Preferably, the reactor has a feed end and an iron-carbon alloy removal end, and the reactor is tilted longitudinally such that the iron-carbon alloy reaction product in the molten bath will flow toward the removal end. The process further includes the step of continuously feeding a solid mineral material into the molten bath of metallic material within the enclosed reactor such that the solid mineral material is mixed into and becomes a part of the molten bath of metallic material, wherein the solid mineral material contains iron carbide, preferably both iron carbide and at least trace amounts of iron oxide, wherein the iron carbide content of the solid mineral material is at least about 50% by weight, and wherein a weight ratio of iron carbide to iron oxide in the solid mineral material is at least about 2 or greater. As used in the present specification, mineral material and/or mineral feed material mean a material including minerals and/or metals in any form whatsoever, and can include processed mineral material, such as iron carbide and the like, which could be characterized as metal or metallic material. It will be appreciated that as the amount of iron oxide becomes smaller and smaller the ratio of iron carbide to iron oxide may approach infinity.

The process further includes the step of simultaneously reacting the molten metallic material with oxygen at a temperature sufficient to generate carbon monoxide as a gaseous reaction product, wherein the step of reacting includes injecting oxygen into the molten bath of mineral material to facilitate the reaction of the oxygen with carbon from the iron carbide to form the carbon monoxide reaction product which subsequently enters a vapor space within the reactor located above the molten bath. In a preferred embodiment of the present invention, oxygen is also injected in the vapor space of the reactor where it reacts with the carbon monoxide reaction product to generate carbon dioxide and heat to drive the reaction. Preferably, the weight ratio of the solid mineral material will be sufficient for the iron carbide to generate sufficient carbon monoxide to generate heat to drive the reaction without any further substantial addition of either heat or a source of heat. It will be appreciated that less additional heat or heat sources will be required as the relative amount of iron oxide, in comparison to iron carbide, is reduced. Preferably, when the weight ratio is high enough, the reaction within the enclosed reactor will be an autogenous reaction which can continue indefinitely without the addition of heat from external sources, or the substantial addition of sources of heat other than incidental hydrocarbons, preferably methane, which enters the molten bath with oxygen which is injected into the molten bath through hydrocarbon shrouded Savard-Lee injectors.

It will be appreciated that the present invention provides many advantages over the existing iron-carbon alloy production technology. The foremost of these advantages are associated with the continuous nature of the process and the fact that the process utilizes an enclosed reactor which prevents the ingress and egress of atmospheric gases and gaseous reaction products, respectively. A continuous reactor system eliminates the added shut-down and start-up time associated with all batch-manufacturing processes. The enclosed reactor system allows for control of the off-gases in a manner that allows further reaction of these gases with other chemical compounds and, also, the recovery of heat which is generated from these reactions. Furthermore, the present process minimizes the need for large, costly air treatment devices which are necessitated by the open-to-the-atmosphere designs of present batch steel-making technologies.

In the present invention, solid mineral material, containing iron carbide, preferably both iron carbide and at least trace amounts of iron oxide, is fed into the enclosed reactor system containing a molten bath of metallic material. A variety of methods may be used to provide this initial molten bath for start-up of the reactor system. A few non-limiting examples include providing external burners to heat the reactor contents or providing a feed pre-heater which is capable of converting the feed material to its molten state. Preferably, the molten bath is generated by heating scrap steel which provides a suitable molten metallic material to initiate the process.

Oxygen is injected into the molten bath of metallic material within the reactor. It is believed that the oxygen reacts efficiently with the iron carbide in the feed to form iron-carbon alloys and carbon monoxide. The carbon monoxide then migrates to the vapor space within the reactor where it reacts with further oxygen supplied to the reactor to generate heat to drive the reaction. It will be appreciated that it will be preferable for the iron carbide to provide the necessary carbon to effectively complete the reduction of iron oxide, and for the weight ratio of iron carbide to iron oxide in the solid mineral feed material to be varied in order to improve the energy efficiency of the reaction. The presence of adequate carbon in the non-sulfur-containing mineral feed material minimizes the need for the substantial addition of supplemental energy. Although supplemental energy could be provided by providing a supplemental carbon source, some common supplemental carbon sources, such as coal, charcoal or the like, generally add sulfur to the system. It will be appreciated that it would be undesirable to make such additions because this could necessitate the installation of costly treatment systems either to control the sulfur emissions from the process or to remove sulfur from the steel end-product.

The carbon monoxide generated in the molten bath, and subsequently present in the vapor space of the reactor, is reacted with oxygen to generate heat and carbon dioxide gas. This oxygen may be available from any excess which is injected into the molten bath and subsequently passes into the vapor space, although this is an unlikely source. Preferably, however, oxygen is injected directly into the vapor space of the reactor through provided nozzles. Oxygen injection into either area may also be varied along the length of the reactor to compensate for variations in the reactivity of the molten metallic material and the carbon monoxide in the vapor space, respectively.

The reaction of carbon monoxide with oxygen in the vapor space is an exothermic reaction producing heat which is at least partially absorbed back into the molten bath to further drive the reaction of iron carbide with oxygen, and the reduction of iron oxide, to form the molten iron-carbon alloy. Some of the heat retained in the carbon dioxide gas leaving the vapor space may also be recovered by utilizing a feed preheater which allows the exchange of heat energy, from carbon dioxide gas exiting the reactor, to the solid mineral material in the feed preheater prior to entering the enclosed reactor. The molar ratio of iron carbide to iron oxide in the solid mineral material feed is preferably varied to provide sufficient carbon, in relation to the amount of iron oxide present, so that sufficient heat energy can be generated from the consecutive oxidative reactions forming carbon monoxide and carbon dioxide, respectively, to drive the reaction process without further substantial addition of heat from an external source of heat or fuel for the generation of heat.

Within the enclosed reactor, it is believed that a steady state condition can be achieved. The contents of the molten bath will consist of two layers with an interface between the two layers. The lower, more dense layer will include molten iron carbide/iron material at the feed end and the iron-carbon alloy reaction product at the iron-carbon alloy removal end. It will be appreciated that there will be a gradation of these materials along the length of the reactor as the lower layer passes toward the removal end and is further reacted with oxygen to generate the desired iron-carbon alloy. The upper layer, or "slag" layer, will be composed of iron oxide and other impurities which were present in the solid mineral feed material. These impurities may include silicon dioxide, magnesium oxide and the like. The formation of the slag layer may be enhanced by the addition of a basic oxide, preferably lime, or calcium oxide, effective to form a low viscosity, low melting point slag.

Both the iron-carbon alloy and the slag layer are continuously removed, preferably from opposite ends of the reactor, so as to create a countercurrent flow between the lower iron-carbon alloy layer and the upper slag layer at the interface thereof. By varying the rate of removal of the iron-carbon alloy, the interface level between the iron-carbon alloy layer and the slag layer may be controlled. In preferred embodiments of the present invention, the molten iron-carbon alloy drawn from the reactor can be further alloyed with alloying compounds such as nickel, molybdenum, manganese, aluminum or the like, to alter physical properties of the iron-carbon alloy products in well-known processes.

These and various other advantages and features of novelty which characterize the present invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there are illustrated and described preferred embodiments of the present invention.

BRIEF DESCRIPTION OF THE DRAWINGS

In the drawings, in which like reference numerals indicate corresponding parts or elements of preferred embodiments of the present invention throughout the several views;

FIG. 7 is a graph depicting the mineral material feed temperature at which point no additional heat source is necessary.

DETAILED DESCRIPTION OF THE PREFERRED EMBODIMENTS

As required, detailed embodiments of the present invention are disclosed herein. However, it is to be understood that the disclosed embodiments are merely exemplary of the present invention which may be embodied in various systems. Therefore, specific details disclosed herein are not to be interpreted as limiting, but rather as a basis for the claims and as a representative basis for teaching one skilled in the art to variously practice the present invention.

Figure 1:
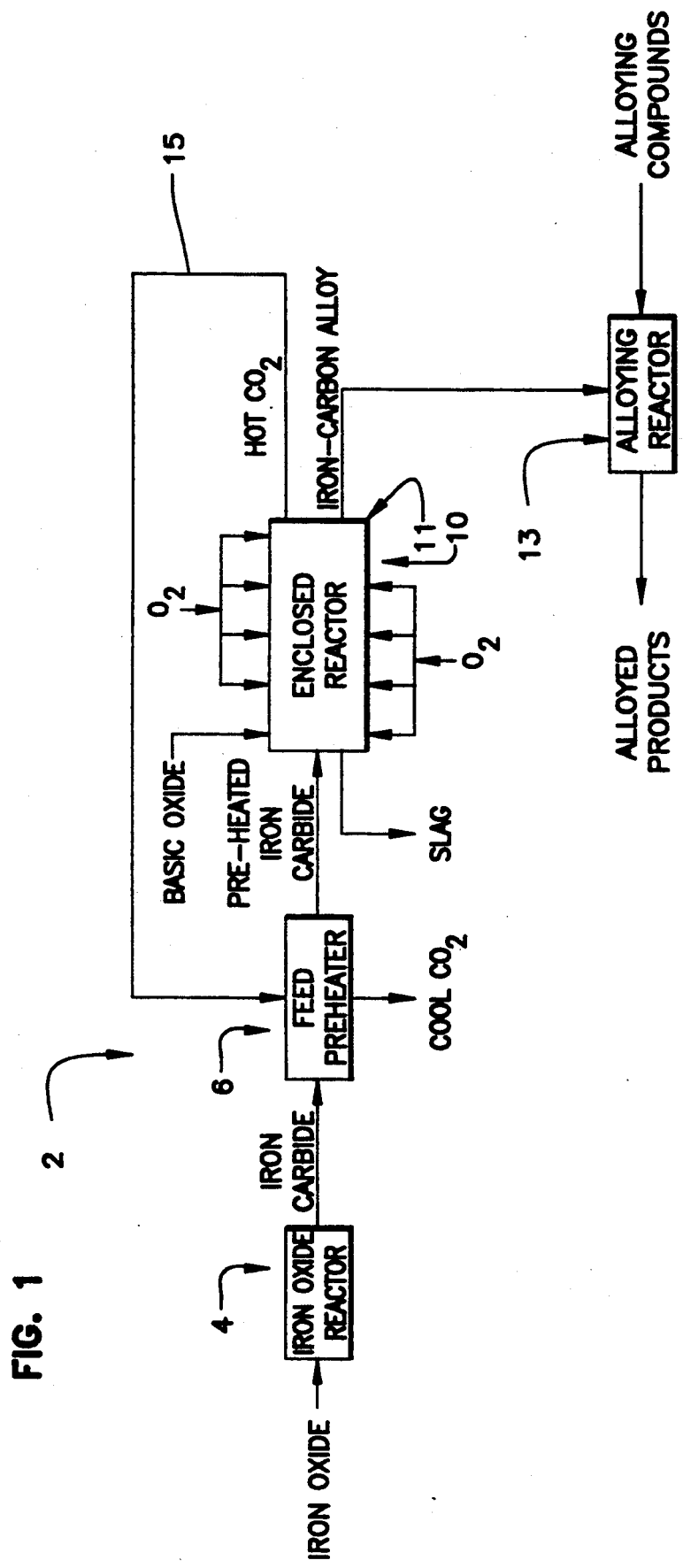
FIG. 1 is a schematic representation of a preferred iron-carbon alloy production system in accordance with the present invention.

Referring now to the figures, FIG. 1 generally presents a schematic representation of a preferred overall manufacturing system (2) of the present invention for the production of iron-carbon alloys and the subsequent alloying thereof. An iron oxide reactor (4) is provided to convert iron oxide into iron carbide in a process similar to that disclosed by Stephens (U.S. Pat. No. RE 32,247) which is incorporated herein by reference. It will be appreciated, however, that processes other than that disclosed by Stephens may be used, and that that process is just a single non-limiting example of such a process.

In preferred embodiments of the present invention, a feed preheater (6) is provided to preheat the iron carbide prior to feeding it into an enclosed reactor (10). It will be further appreciated, however, that it is unnecessary to preheat the iron carbide feed prior to feeding it into the enclosed reactor (10). It will be further appreciated that the iron carbide feed will be only a portion of the solid mineral material (20) which is fed into the enclosed reactor (10). Although the iron carbide will be at least half of the solid mineral material (20), and preferably more, other mineral components will be fed into the enclosed reactor (10) with the iron carbide. One of the more significant mineral components will be an amount of iron oxide which is not fully reduced to iron carbide in the iron oxide reactor (4). It will be appreciated that additional iron oxide can be combined with the predominantly iron carbide product of the reduction process in the iron oxide reactor (4). Alternatively the operation of the iron oxide reactor (4) can be manipulated to produce an iron carbide product having a desired weight ratio of iron carbide to iron oxide. In this way a solid mineral material (20) feed can be provided to the enclosed reactor (10) which has a certain desired ratio of iron carbide to iron oxide as further discussed hereinbelow.

Figure 2:
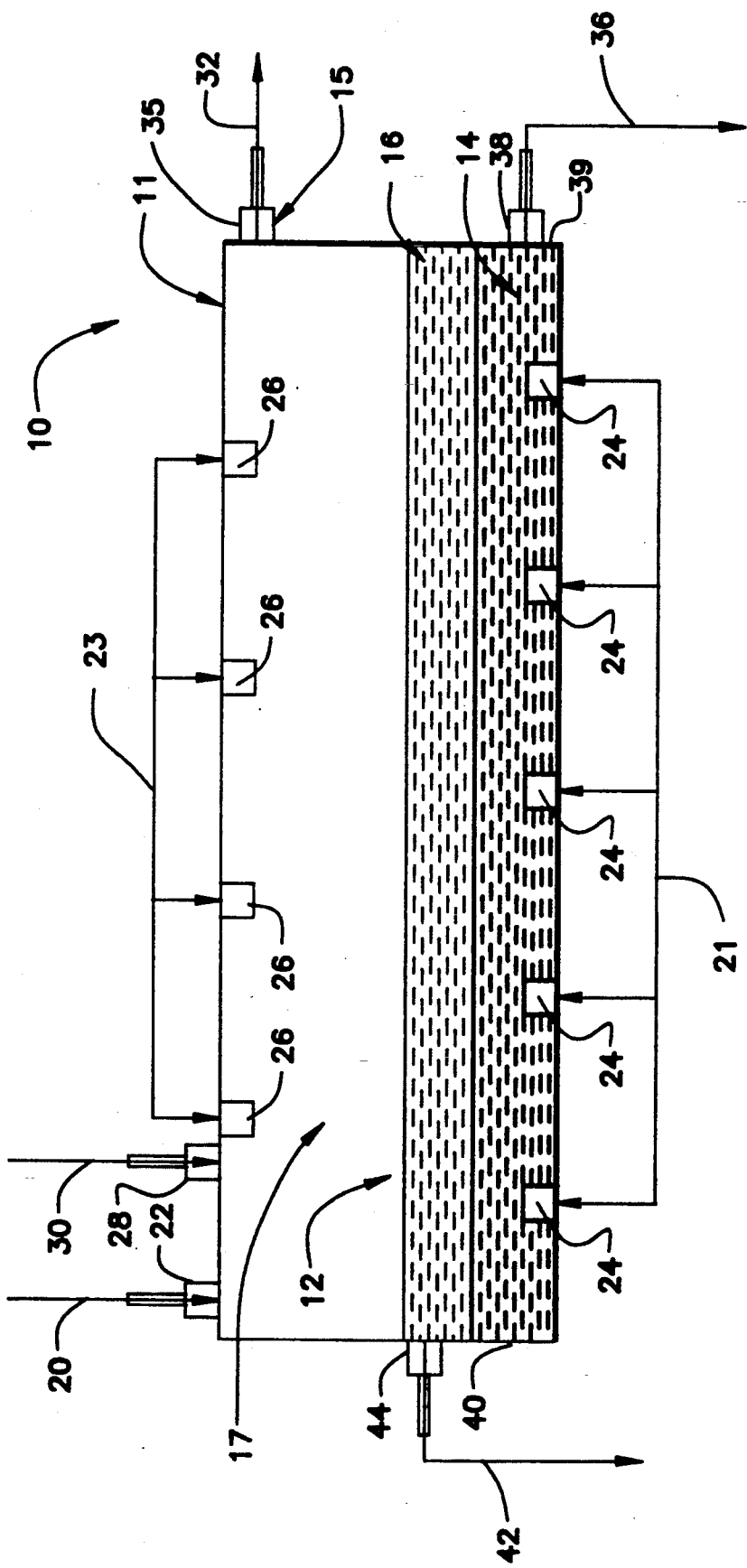
FIG. 2 is an enlarged schematic representation of an enclosed iron carbide reactor of the present invention illustrated in FIG. 1.

Referring now also to FIG. 2, the enclosed reactor (10) includes a reactor housing or enclosure (11) which receives the solid mineral material feed (20). In preferred embodiments, a basic oxide (30) is also provided, as is oxygen (21 and 23). The reaction process generates iron-carbon alloy (36) and slag (42) which are preferably removed at opposite ends of the enclosed reactor (10). In preferred embodiments, the removed iron-carbon alloy (36) is subsequently further alloyed with alloying compounds in an alloying reactor (13) to produce alloyed products by alloying processes which are well known in the art.

The reaction in the enclosed reactor (10) also produces hot carbon dioxide gas ($CO_2$). In preferred embodiments, the hot carbon dioxide gas (32) is passed out of the reactor housing (11) through an off-gas conduit (15), which directs the hot carbon dioxide into the feed preheater (6) where the heat from the hot $CO_2$ is used to preheat the solid mineral material before the solid mineral material is fed into the enclosed reactor (10).

The solid mineral material feed (20) is fed into the reactor housing (11) via a mineral feed inlet mechanism (22). Once in the reactor housing (11), the solid mineral material feed (20), preferably preheated, enters a molten bath (12) of molten metallic material. The bath (12) consists of a lower, denser iron-carbon alloy or metal layer (14) and an upper, lighter slag layer (16). The solid mineral material (20) mixes with the molten metallic material of the molten bath (12) and becomes a part thereof. It is believed, but not relied upon, that the iron carbide and iron oxide components of the mineral material actually dissolve into the molten metallic material.

In preferred embodiments of the present invention, oxygen (21) is injected into the molten bath (12) through submerged injection nozzles (24). These injection nozzles (24) are preferably Savard-Lee, fluid-shrouded, submerged oxygen injectors as disclosed by Knuppel et al. (U.S. Pat. No. 3,932,172) which is incorporated herein by reference. The oxygen (21) is preferably shrouded with a gaseous hydrocarbon, preferably with methane gas ($CH_4$) (not shown). Upon entering the molten bath (12), the oxygen (21) reacts exothermally with carbon from the iron carbide to generate carbon monoxide gas which enters a vapor space (17) above the molten bath (12). A gaseous hydrocarbon is used to shroud the oxygen (21) in order to minimize the degree to which this reaction takes place immediately proximate the injection nozzles (24), so that the heat from the exothermic reaction does not damage the injection nozzles (24). It will be appreciated that some of the oxygen (21) injected into the molten bath (12) can pass out of the molten metallic material and into the vapor space (17) above the molten bath (12), but that this is highly unlikely. It is further noted that, although that the hydrocarbon gas, or methane, injected into the molten bath (12) with the oxygen (21) is technically a source of heat energy, this hydrocarbon gas is an incidental source of heat energy and is not considered to be a substantial source of either carbon or heat energy in the present invention. In alternate embodiments of the present invention, methane gas ($CH_4$) (not shown) or other hydrocarbons can be injected into the reactor (10), preferably the vapor space (17), in substantial amounts in order to provide an additional source of energy to drive the reactions within the enclosed reactor (10). Additional energy sources may also be provided. These sources include, but are not limited to, coal, charcoal and other carbon sources, as well as electric energy from an electric arc or other electric means. In preferred embodiments, however, additional energy is unnecessary so long as the ratio of iron carbide to iron oxide is high enough to generate an autogenous reaction in the reactor (10). Preferably, the exothermic reactions of oxygen and carbon from the iron carbide, and oxygen with carbon monoxide provide for or account for at least about 90%, preferably about 95%, more preferably about 97%, even more preferably about 99%, and most preferably about 100% of the energy required for the indefinite continuation of the reaction in the reactor (10).

Oxygen (23) is also injected into the vapor space (17) via oxygen inlets (26) in preferred embodiments. The oxygen (23) injected into the vapor space (17) reacts with the carbon monoxide reaction product from the molten bath to generate carbon dioxide in an exothermic reaction. The heat from this reaction drives other reactions within the reactor housing (11).

The solid mineral material feed (20) is fed into the molten bath (12) continuously. The feed material (20) can be added through the surface of the slag (16) in the upper layer (11) of the molten bath (12), and can also be submerged (not shown) directly into the metal layer (14). Iron-carbon alloy (36) which results from the reaction which takes place in the molten bath (12) is continuously removed via an alloy outlet port (38) at an alloy removal end (39) of the reactor housing (11) which is preferably the lower of the two ends, and the end opposite to a feed end (40) of the reactor housing (11). At the same time, slag (42) is continuously removed from the feed end (40) of the housing (11) via a slag removal port (44). Because the slag (42) is removed from the opposite end of the enclosed reactor (10) as the iron-carbon alloy (36), a continuous countercurrent flow is created at an interface between the iron-carbon alloy layer (14) and the slag layer (16). This is desirable for the efficient removal of mineral impurities from the iron-carbon alloy and the reduction of the iron oxide content of the slag to a low level consistent with that generated during the production of comparable competitive products.

Preferably, a basic oxide (30), such as lime or the like, is fed into the enclosed reactor (10) via a basic oxide feed inlet mechanism (28). The basic oxide (30) is needed to enhance generation of the slag layer (16). It will be appreciated that any well-known inlet mechanisms for providing feed access to an enclosed space while limiting the ingress and egress of atmospheric gases and gaseous reaction product, respectively, can be used to provide the mineral feed mechanism (22) and the basic oxide feed inlet mechanism (28), including, but limited to, rotary air locks suitably for the present purpose, and other known inlet means suitable for this purpose.

The reactor (10) is enclosed to the extent necessary to prevent the ingress and egress of atmospheric gases and gaseous reaction products, respectively. Hot carbon dioxide gas (32) can pass out of the vapor space (17) into the off-gas conduit (15) via a gas outlet mechanism (35). The shape of the reactor housing (11) may vary, provided adequate internal capacity exists to allow the formation of a two-phase or double layered molten bath (12). The lower, more dense layer (14) of the molten bath contains the molten iron-carbon alloy, while the lighter, upper layer (16) is composed of slag material. The reactor housing (12) is preferably built such that the removal end (39) will be slightly lower than the feed end (40), so that the reactor (10) can be emptied readily. In a preferred embodiment of the present invention, the reactor (10) consists of an elongated cylindrical reactor design similar to the Queneau-Schuhmann (QS) reactor or continuous oxygen converter disclosed by Queneau et al. (U.S. Pat. No. 4,085,923), which is incorporated herein by reference. It will be understood, however, that other known reactor designs will satisfy the requirements of this invention and that variations in the shape of the reactor are not considered to be essential to the invention disclosed herein. In preferred embodiments, the enclosed reactor (10) will be equipped with a mechanism (not shown) about which the reactor housing (11) can be rotated 90° about a longitudinal axis (not shown) so as to allow for cleaning and repair of the submerged nozzles (24). In this way the molten bath (12) can be displaced to allow for better access to the injection nozzles (24).

The preferred mineral material feed (20) to the enclosed reactor (10) is a finely divided solid material containing iron carbide, preferably both iron carbide and at least trace amounts of iron oxide, along with small quantities of gangue materials and other impurities. These impurities may include, but are not limited to, silicon dioxide, magnesium oxide, metallic iron, free carbon and the like. The weight ratio of iron carbide to iron oxide in the solid mineral feed may vary depending upon the process used to produce the iron carbide in the feed materials. As the amount of iron oxide in the mineral material (20) becomes smaller and smaller, the weight ratio can approach infinity. However, there will virtually always be a small amount of iron oxide, even if only in trace amounts. The mineral material fed to the reactor system is preferably in a powder or granular form with a particle distribution preferably ranging from about 1 millimeter to about 10 micrometers, although particle size is not a limiting factor in the practice of this invention.

In preferred embodiments of the present invention, the weight ratio of iron carbide to iron oxide in the mineral material feed (20) is at least about 2 or greater, more preferably about 3 or greater, even more preferably about 4 or greater. In more preferred embodiments of the present invention this ratio can be about 6:1, preferably about 8:1, and more preferably about 10:1 or greater. When the weight ratio of iron carbide to iron oxide is about 18:1, preferably about 20:1, and the mineral feed material (20) contains at least about 75%, preferably about 85%, more preferably about 90% by weight of iron carbide, it is believed that there may be enough carbon present in the mineral feed material (20) to eliminate the need to add additional energy or sources of energy to the reactor (10) to drive the reactions therein. It is, however, recognized that the reactor (10) system may be operated when utilizing weight ratios of iron carbide to iron oxide of less than about 18, provided additional carbon, in the form of coal, charcoal or the like, or some other source of heat energy, is added to the enclosed reactor (10). As noted herein above, however, it is undesirable to add a further source of carbon due to the presence of sulfur and other contaminants in most carbon sources. Such contaminants might necessitate the use of expensive emission control systems and may add undesirable impurities to the end-products. It will be appreciated that, the greater the ratio of iron carbide to iron oxide, the more self-sufficient the reaction will be in terms of the energy needed to drive the reaction.

Recently, Professor Paul Queneau has suggested the possibility of modifying a QSL reactor (see "The QSL Reactor for Lead and its Prospects for NI, CU, FE", Journal of Metals, December, 1989, pages 30–35), so that steel can be made continuously from iron oxide. It will be appreciated, however, that prior to the present invention, consideration has not been given to the utilization of a solid mineral material feed (20) which is made up of at least about 50, preferably about 60, more preferably about 70, even more preferably about 75, even more preferably about 80, even more preferably about 90, and even more preferably about 95% by weight or greater of iron carbide material. In preferred embodiments, the solid mineral material (20) can be as much as about 98%, preferably about 100% by weight iron carbide with trace amounts of other components such as iron oxide and the like. The iron carbide content can be as much as about 100%, more preferably about 65% to about 99%, more preferably about 80% to about 98%, and most preferably about 85% to about 97% by weight of the solid mineral material (20). It is preferable to minimize the iron oxide content of the solid mineral material feed (20) in order to minimize the amount of supplemental energy required to drive the reactions in the enclosed reactor (10). Iron oxides found in the iron carbide may include, without limit, $Fe_3O_4$, FeO and the like, or any combination thereof.

Operation of the reactor system requires the presence of the molten bath (12) of mineral material within the enclosed reactor (10) prior to continuously feeding the solid mineral material feed (20). This start-up bath may be provided by various means. In alternative embodiments, solid mineral material feed (20) can be fed into the enclosed reactor (10) to provide an initial charge of mineral material; however, this is believed to require a great deal of heat and may not be easily accomplished, if at all. Such an initial charge could be converted to its molten state by the addition of heat through an external heat source. Preferably, however, the molten bath (12) is initially created from scrap metal, mostly steel, iron or the like, which is melted to form an initial molten bath (12). Alternatively, heat could be transferred to the solid mineral material feed (20) from an external heat source as the mineral material (20) is fed to the reactor (10). It will be appreciated, however, that any system which supplies sufficient heat to create an initial molten bath (12) of metallic material in the enclosed reactor (10) would fall within the practice of the present invention.

Oxygen, a necessary reactant for this system, is injected into the molten bath (12) of mineral material within the enclosed reactor (10) to facilitate the reaction of oxygen with the iron carbide to form carbon monoxide. In preferred embodiments, the amount of oxygen (21) injected through the various injection nozzles (24) below the surface of the molten bath (12) is varied along the length of the reactor (10) to compensate for increased oxidation potential of the metal and slag layers (14 and 16, respectively) at the removal end (39), as compared to the feed end (40) of the enclosed reactor (10).

The carbon monoxide generated in the enclosed reactor (10) travels from the molten bath (12) to the vapor space (17) within the reactor (10). In preferred embodiments, this carbon monoxide gas is reacted with oxygen in the vapor space (17) in an exothermic reaction to form carbon dioxide. The source of oxygen to accomplish this reaction may be excess oxygen injected below the surface of the molten bath (12), although this is an improbable source, and/or additional oxygen (23) which is injected through oxygen injection inlets (26).

The heat generated by the carbon monoxide/oxygen reaction to form carbon dioxide is partially transferred back to the molten bath (12) to further the reactions within the enclosed reactor (10). Carbon dioxide can leave the vapor space (17) through the off-gas outlet (35). The carbon dioxide formed in the vapor space (17), containing heat energy not transferred to the molten bath (12), can be further processed to recover remaining heat energy. In a preferred embodiment, the hot carbon dioxide gas in the vapor space (17) is passed through the off-gas outlet (35) to the off-gas conduit (15), to the preheater (6) to allow for the transfer of the excess heat energy to the solid mineral material feed (20). Preferably, the preheater (6) is a double-walled kiln. However, it will be understood that any preheater design which allows the transfer of heat energy from the hot carbon dioxide to the mineral material feed will suffice.

The amount of carbon monoxide generated from the reaction of the iron carbide with the oxygen injected below the surface of the molten bath (12) will vary with the ratio of iron carbide to iron oxide in the mineral material feed (20) and the desired carbon content of the iron-carbon alloy product. It will be appreciated that, as a consequence of this ratio, the amount of carbon monoxide available for the exothermic reaction with oxygen to form carbon dioxide will depend on the iron carbide concentration in the mineral material feed. In preferred embodiments, the weight ratio of iron carbide to iron oxide in the feed is about 2:1, more preferably about 4:1, more preferably about 8:1, more preferably about 10:1, more preferably about 15:1, more preferably about 18:1 or greater. In a most preferred embodiment the weight ratio of iron carbide to iron oxide is sufficient so that enough carbon is supplied to the reactor system to provide sufficient heat generation in the subsequent carbon monoxide to carbon dioxide reaction so that there is no need for adding heat from an external source to drive the iron carbide/oxygen reaction or other reactions within the enclosed reactor (10). Operation with an external heat source is possible. However, it is believed that a steady state can be achieved within the enclosed reactor (10). Thus, the solid mineral material (20) may be continuously fed to one end (40) of the enclosed reactor (10) while iron-carbon alloy (36) is continuously removed from the other end (39) of the enclosed reactor (10). In this way a continuous supply of iron-carbon alloy having consistent physical properties and carbon content is produced. It is believed that the slag layer (16) will form within the enclosed reactor (10) and form a layer above the molten iron-carbon alloy layer (14). Furthermore, slag (42) can be continuously removed from the enclosed reactor (10) at the feed end (40) of the reactor (10). The basic oxide (30) is believed to be effective to form a low viscosity, low melting point slag layer (16) from the impurities in the metallic material in the alloy layer (14).

Figure 3:
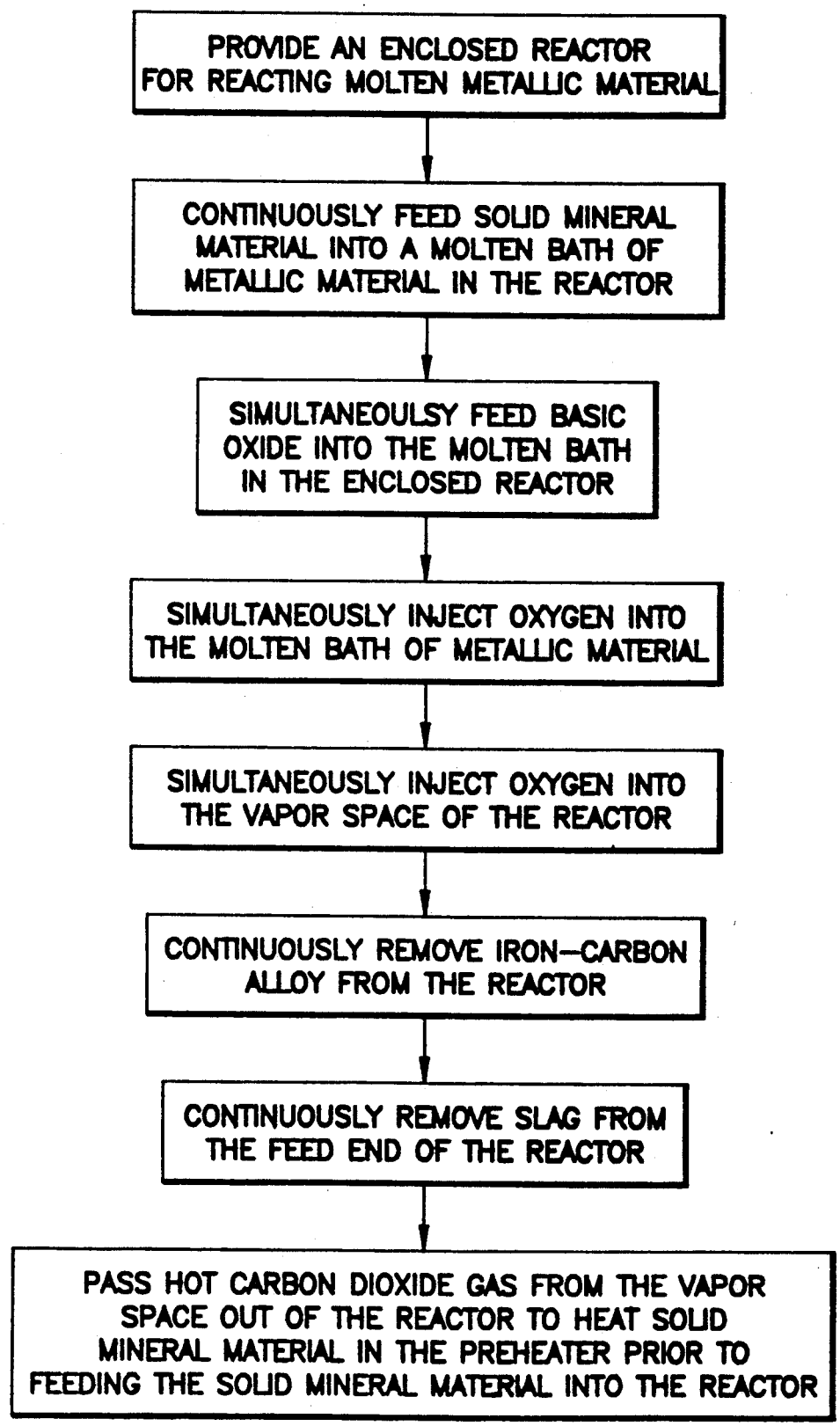
FIG. 3 is a flow diagram of process steps in accordance with a preferred embodiment of the present invention.

Referring now also to FIG. 3, a preferred process for the continuous production of an iron-carbon alloy is described. This process includes the following steps. First, providing an enclosed reactor (10) for reacting molten mineral material, wherein the reactor (10) is capable of limiting the ingress and egress of atmospheric gases and gas reaction products, respectively. The enclosed reactor (10) has a molten bath (12) of metallic material and a vapor space (17) above the molten bath (12) to receive gaseous reaction products from the molten bath (12). The enclosed reactor (10) further includes a feed end (40) and an iron-carbon alloy removal end (39). Second, continuously feeding solid mineral material (20) into the molten bath (12) of metallic material in the enclosed reactor (10). Third, simultaneously feeding basic oxide (30) into the molten bath (12) in the enclosed reactor (10). Fourth, simultaneously injecting oxygen (21) with hydrocarbon shrouding, preferably methane shrouding, into the molten bath (12) of metallic material. Fifth, simultaneously injecting oxygen (23) into the vapor space (17) of the enclosed reactor (10). Sixth, continuously removing iron-carbon alloy from the iron-carbon alloy removal end (39) of the enclosed reactor (10). Seventh, continuously removing slag from the feed end (40) of the enclosed reactor (10). Eighth, passing hot carbon dioxide gas from the vapor space (17) out of the enclosed reactor (10) to heat solid mineral material in the preheater (6) prior to feeding the solid mineral material (20) into the enclosed reactor (10). It will be appreciated that further steps and modifications of the steps described hereinabove, consistent with the present invention disclosed herein and with known manufacturing processes, will fall within the broad principles of the present invention.

Theoretical thermochemical calculations were completed relative to iron-carbon alloy production from the process disclosed herein. It is believed these calculations project the chemical and thermodynamic operation of an actual embodiment of the invention.

As a basis for these calculations it is assumed 1000 kg of iron-carbon alloy are produced from the necessary quantities of reactants based on a mass balance of the overall system. The necessary reactants are further defined by assuming that the stoichiometrically balanced reactions shown immediately hereinbelow occur within the reactor. Following the list of reactions is a summary of other conditions and assumptions used in calculating the theoretical thermochemical operation of the reactor system. It will be appreciated that the projections derived hereby, are believed to be reliable projections, but that they cannot be fully relied upon without further experimentation.

Reactions Assumed to Occur in the Reactor a) $4 Fe_3C(s) + Fe_3O_4(l) = 15 Fe(l) + 4CO$ in bath
b) $Fe_3C(s) + \frac{1}{2}O_2(g) \rightarrow 3 Fe(l) + CO$ in bath
c) $CH_4 + \frac{1}{2}O_2 \rightarrow CO + 2H_2$ in bath
d) $CaO(s) + SiO_2(l) \rightarrow CaSiO_3(l)$ in slag
e) $Fe(l) + \frac{1}{2}O_2(g) \rightarrow FeO(l)$ in slag
f) $CO(g) + \frac{1}{2}O_2(g) \rightarrow CO_2(g)$ in freeboard
g) $H_2(g) + \frac{1}{2}O_2(g) \rightarrow H_2O(g)$ in freeboard

Other Assumptions and Base Conditions Used

1. Thermochemical calculations were completed at two assumed mineral material feed compositions:

| COMPOSITION 1 | COMPOSITION 2 |
|---|---|
| 88% $Fe_3C$ | 92% $Fe_3C$ |
| 8% $Fe_3O_4$ | 4% $Fe_3O_4$ |
| 1% CaO (MgO) | 1% CaO (MgO) |
| 3% $SiO_2$ | 3% $SiO_2$ |

Further, thermochemical calculations were completed for feed composition 2 at two feed temperatures, a non-preheated 298K and a preheated 773K.

2. The slag forming oxide used in these calculations is 100% CaO, fed at a temperature of 298K 3. The oxygen fed through injectors (24) into the molten bath (12) or into the vapor space (17) is 100% $O_2$ at a feed temperature of 298K 4. Methane (natural gas) is used as a fluid shroud to protect the $O_2$ injectors (24), yet affects the thermochemical calculations as a carbon and heat source. It is assumed the natural gas is 100% methane, fed at 298K.

5. The Carbon content of the iron-carbon alloy produced is varied incrementally from 0.1% to 0.4%. The iron content is thus 100% minus the percentage of carbon in the iron-carbon alloy. The iron-carbon alloy leaving reactor (10) is projected to have a temperature of 1873K.

6. The slag product is assumed to maintain the same CaO to $SiO_2$ ratio as that in the feed: 67 wt. % CaO 33 wt. % $SiO_2$. The slag is projected to leave the reactor (10) at a temperature of 1923K.

7. Off-gases from the reactor (10) can be composed of $O_2$, CO, $CO_2$ and $H_2O$ to make up about 100% of the off-gases. The relative concentration, however, varies with the feed composition. It is assumed that the off-gases leave the reactor (10) at 2000K.

Mass Balance Stoichiometric Relationships

Mass must be conserved in the reactor system for each element. Thus, the sum total of the mass of each element found in all incoming streams must equal the sum total of the mass of each element found in all outgoing streams. Theoretical mass balances for each element found in the reactor system are listed below, with incoming streams listed on the left side of the equation and outgoing streams on the right side. The stream in which the element is contained is shown as a subscript of the element.

1. Fe mass balance:

$$W_{Fe\ in\ Fe_3C\ in\ feed} + W_{Fe\ in\ Fe_3O_4\ in\ feed} = W_{Fe\ in\ Fe-C\ alloy} + W_{Fe\ in\ slag\ as\ FeO}$$

2. C balance:

$$W_{C\ in\ Fe_3C} = W_{C\ in\ steel} + W_{C\ in\ CO_2} + W_{C\ in\ CO}$$

3. Oxygen balance:

$$W_{O_2\ in\ Fe_3O_4} + W_{O_2\ injected\ via\ bottom\ injectors} + W_{O_2\ injected\ into\ vapor\ space} =$$

$$W_{O_2\ in\ CO_2\ off\text{-}gas} + W_{O_2\ in\ CO\ off\text{-}gas} + W_{O_2\ in\ H_2O\ off\text{-}gas} + W_{O_2\ in\ slag\ as\ FeO} + W_{O_2\ in\ off\text{-}gas}$$

4. $SiO_2$ balance:

-continued $$W_{SiO_2 \text{ in mineral feed}} = W_{SiO_2 \text{ in slag}}$$

5. CaO balance:
$$W_{CaO \text{ in mineral feed}} + W_{CaO \text{ in basic oxide added}} = W_{CaO \text{ in slag}}$$

6. Hydrogen balance:
$$W_{H_2 \text{ in } CH_4 \text{ injected via injectors}} = W_{H_2 \text{ in } H_2O \text{ in off-gas}}$$

7. Slag Composition (assumed CaO added to maintain this ratio):

$$\left[\frac{\text{Wt. \% CaO}}{\text{Wt. \% SiO}_2}\right]_{slag} = 2.0$$

8. It is believed that the equilibrium data for the relationship of % carbon in the molten iron-carbon alloy layer (14) to the % iron oxide (FeO) formed in the slag layer (16) show the following relative relationships:

| % C in Steel | % FeO in slag |
|---|---|
| 0.05 | 35% |
| 0.10 | 25% |
| 0.20 | 12% |
| 0.40 | 6% |
| 0.80 | 6% |

Theoretical Heat Balance

An overall theoretical energy balance for the reactor system is provided herein below. When viewing the system as a whole, energy must be conserved. The sum of all heat gains and losses, whether from changes in temperature of the compound or from the release or consumption of heat energy in a chemical reaction must equal zero. A further term $\Delta H_{loss \text{ from reactor walls}}$ is also included to account for heat loss through the reactor wall to the surrounding environment. It is assumed the iron-carbon alloy will have an exit temperature of 1873K.

$$[H_{1873} - H_{298}]_{lime} + [H_{1873} - H_{298}]_{O_2} +$$
$$[H_{1873} - H_{T\,inlet}]_{Fe_3C} + [H_{1873} - H_{T\,inlet}]_{Fe_3O_4} +$$
$$[H_{1873} - H_{T\,inlet}]_{SiO_2} + [H_{1873} - H_{T\,inlet}]_{Ca} +$$
$$[H_{1873} - H_{298}]_{CH_4} + \sum_a^g \Delta H_{R \times 1873} + \Delta H_{loss\,from\,reactor\,walls} +$$
$$[H_{2000} - H_{1873}]_{CO} + [H_{2000} - H_{1873}]_{CO_2} +$$
$$[H_{2000} - H_{1873}]_{H_2O} + [H_{1923} - H_{1873}]_{slag} = 0$$

Simultaneous solution of the mass balances numbered 1-6, plus the heat balance shown above, when subject to mass balance number 7 and the equilibrium conditions numbered 8, can be used to generate projections for the thermochemical operation of the enclosed reactor (10). To solve the balances, two variables have been fixed for each individual calculation, then varied incrementally over an expected range of operation. These are % carbon in the iron-carbon alloy product and % heat loss from the reactor walls. The heat loss from the reactor walls is varied from 5 to 10 to 15% of the heat input from $$\sum_a^g \Delta H_{R \times 1873}$$

and the % carbon in the iron-carbon alloy is variables from 0.1 to 0.4%. This results in dependent variables of extra oxygen introduced into the vapor space which converts varying amounts of CO emerging from the molten bath (12) into $CO_2$, and $H_2$ to $H_2O$. Where the heat balance is not satisfied (e.g. more heat is needed than is available from the above reactions within the reactor (10)) the balance is achieved by adding excess CO to generate $CO_2$. This shows up as a negative CO output.

Figure 4:
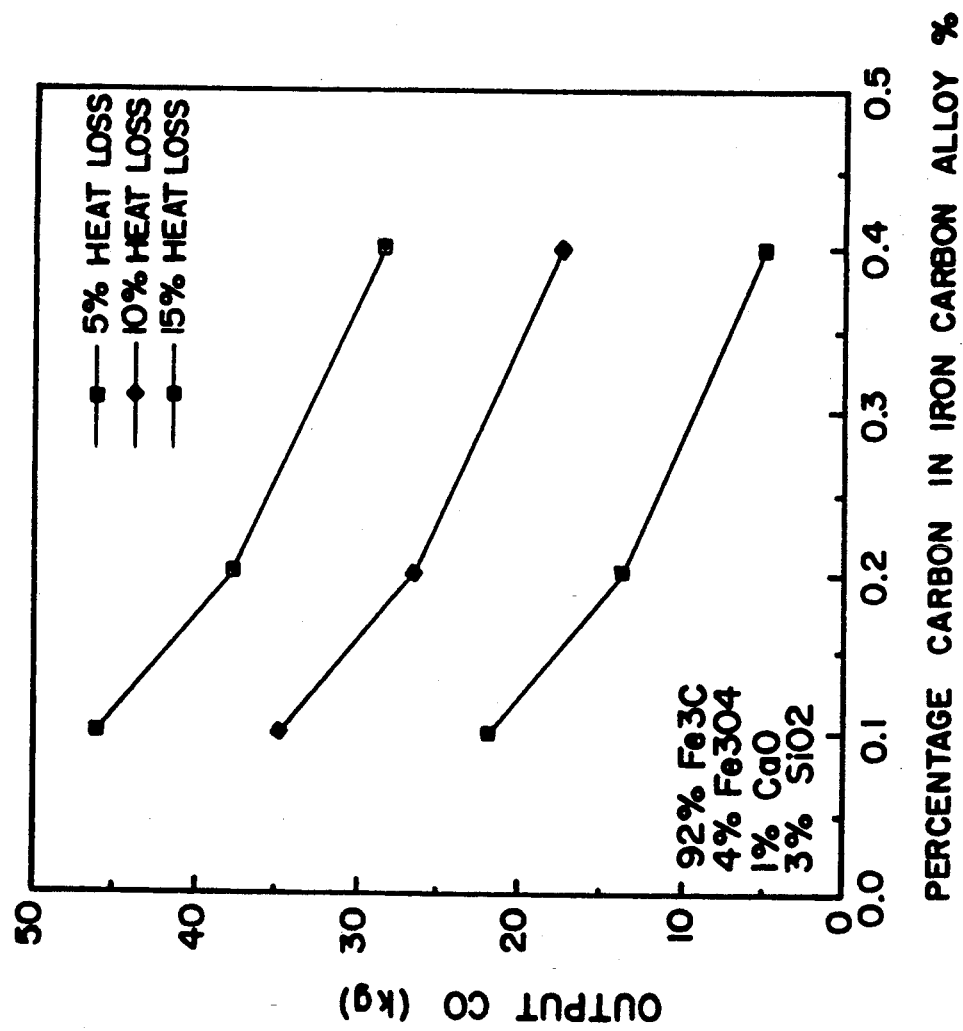
FIG. 4 is a graph showing the relationship of carbon monoxide generation to the percentage of carbon in the iron-carbon alloy product at a feed composition of 92% iron carbide and 4% iron oxide.

Referring now also to FIGS. 4-7, the results of computer projections for these mass and energy balances over the stated ranges are shown graphically in these figures. FIG. 4 is a graphical representation of projections from the simultaneous solution of the mass and energy balances as stated above for a mineral material feed composition of 92% iron carbide, 4% iron oxide and 4% impurities. The mineral material feed temperature is 773K. The three lines represent assumed heat loss through the reactor walls of 5, 10 and 15% of the heat generated, respectively. Along the horizontal axis of FIG. 4 the percent carbon in the iron carbon-alloy product is varied from 0.1% to 0.4% for each assumed heat loss. As noted above, it is assumed 1000 kg iron-carbon alloy will be produced. The vertical axis is used to plot the resultant carbon monoxide output or input which satisfies the mass and energy balance. A negative output indicates that carbon monoxide must be added and reacted with oxygen to satisfy the energy balance. As shown in FIG. 4, the energy balance is satisfied at all conditions plotted without a need for the addition of heat from an external source.

Figure 5:
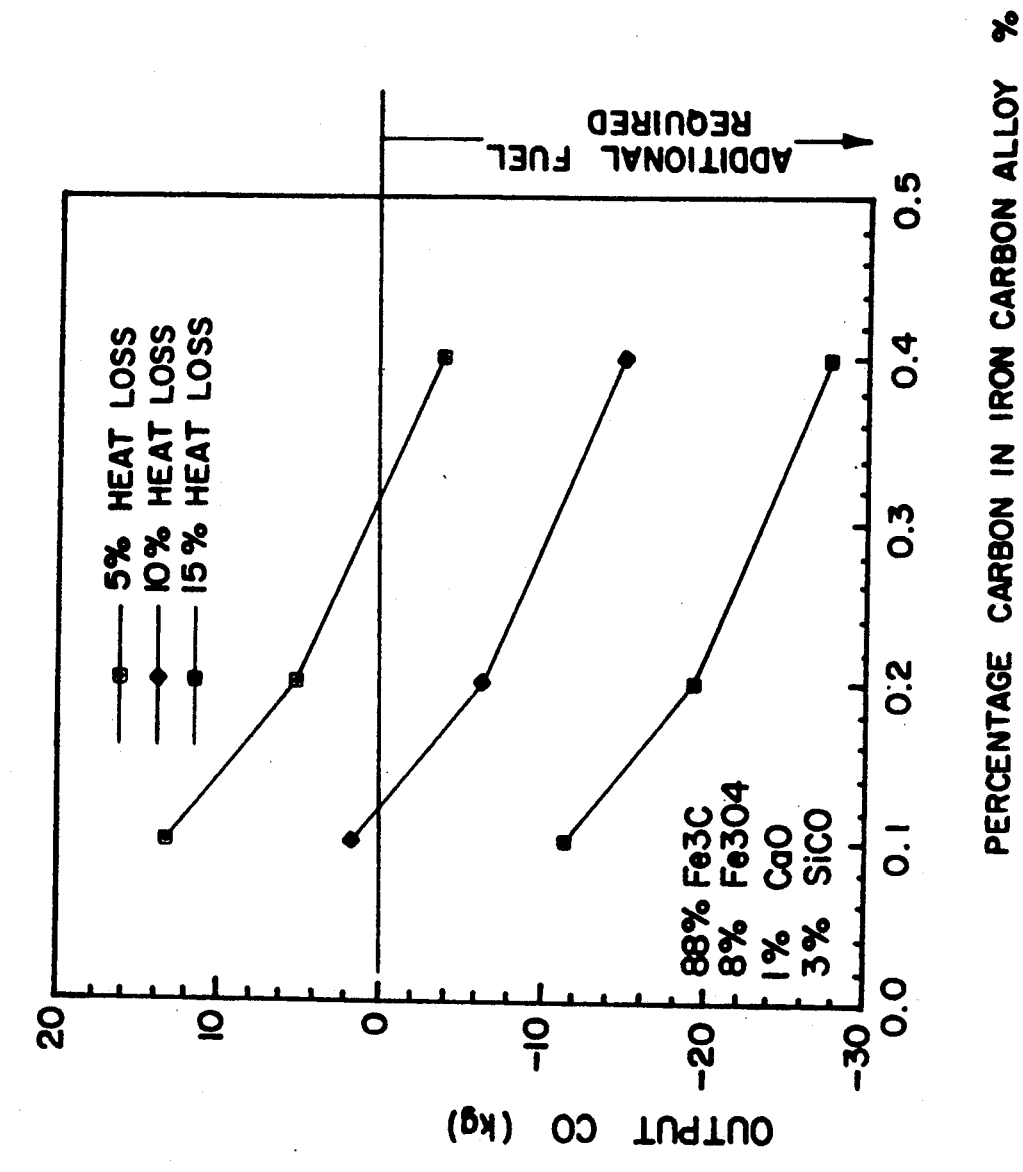
FIG. 5 is a graph showing the relationship of carbon monoxide generation to percentage carbon in the iron-carbon alloy product at a feed composition of 88% iron carbide and 8% iron oxide.

FIG. 5 is similar to FIG. 4 in that it graphically presents projections for the solution of the same mass and energy balances and duplicates the variables graphed; however, the mineral material feed composition is altered to reduce the available iron carbide in the mineral material feed to 88% iron carbide. The iron oxide present in the mineral material feed is increased to 8% while impurities are maintained at 4%. The feed temperature of 773K and the assumption that 1000 kg of iron-carbon alloy are produced are maintained.

The effect of the iron-carbide present in the feed on the energy balance is graphically illustrated in FIGS. 4 and 5. At many points the output of carbon monoxide is negative, which indicates the necessity of adding additional fuel or heat to accomplish the desired reactions.

Figure 6:
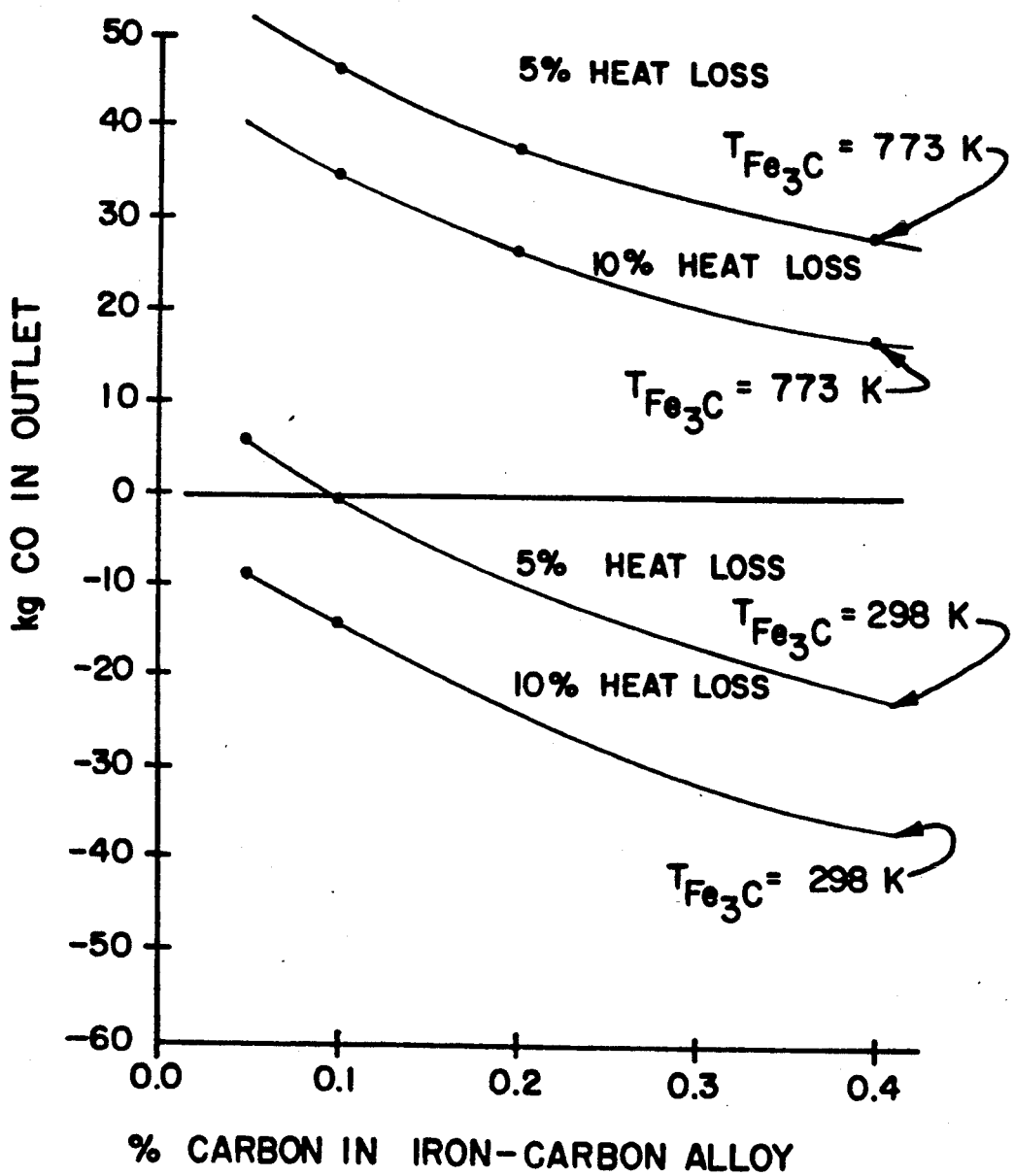
FIG. 6 is a graph showing the effect on the overall energy balance of preheating the solid mineral material feed.

FIG. 6 is a graphical representation of projections illustrating the beneficial effect of preheating the solid mineral material feed (20) prior to feeding it into the enclosed reactor (10). For this calculation it is assumed the solid feed composition is 92% iron carbide, 4iron oxide and 4% impurities. It is further assumed that 1000 kg of iron-carbon alloy are produced. The heat loss through the reactor walls is assumed to be either 5% or 10% as indicated. The percent carbon in the iron-carbon alloy is varied from about 0.05% to 0.4% and calculations are completed at mineral material feed temperatures of 298K and 773K. The vertical axis indicates the carbon monoxide output from the reactions in the enclosed reactor (10), which is indicative of the need to add heat or fuel to the system when the carbon monoxide output is negative. In many instances, the use of off-gases to preheat the mineral material feed provides adequate energy to continue the reactions within the enclosed reactor (10).

FIG. 7 graphically represents the temperatures of the mineral material feeds at which no additional fuel or heat must be added to the enclosed reactor (10), assuming the various levels of heat loss discuss above. As in the calculations for FIG. 6, the feed composition is 92%, 4% iron oxide and 4% impurities, with 1000 kg of iron-carbon alloy production assumed. However, the percent carbon in the iron-carbon alloy product is fixed at 0.2%. When the output of carbon monoxide equals zero, the mineral material feed temperature is believed to be adequate to supply enough energy to continue the reactions within the enclosed reactor (10) without additional heat or fuel from external sources.

It will be understood, however, that even though these numerous characteristics and advantages of the invention have been set forth in the foregoing description, together with details of the structure and function of the invention, the disclosure is illustrative only, and changes may be made in detail, especially in matters of shape, size and arrangement of the parts or in the sequence or the timing of the steps, within the broad principle of the present invention to the full extent indicated by the broad general meaning of the terms in which the appended claims are expressed.

What is claimed is:

1. A process for the continuous production of an iron-carbon alloy, said process comprising the steps of:
    (a) providing reactor means for receiving and reacting mineral material in a continuous process, wherein said reactor means include an enclosed reactor containing a molten bath of metallic material, said enclosed reactor being capable of limiting the ingress and egress of atmospheric gases and gaseous reaction products, respectively;
    (b) continuously feeding solid mineral material into the molten bath of metallic material within the enclosed reactor such that the solid mineral material is mixed into and becomes a part of the molten bath of metallic material, wherein the solid mineral material contains both iron carbide and at least trace amounts of iron oxide, wherein the iron carbide content of the solid mineral material is at least about 50% by weight, and wherein the weight ratio of iron carbide to iron oxide in the solid mineral material is at least about 2 or greater; and
    (c) simultaneously reacting the molten metallic material with oxygen at a temperature sufficient to generate carbon monoxide as a gaseous reaction product, wherein the step of simultaneously reacting includes injecting oxygen into the molten bath of metallic material within the reactor to facilitate the reaction of the oxygen with carbon of the iron carbide to form the carbon monoxide reaction product which subsequently enters a vapor space within the reactor located above the molten bath.

2. The process for the continuous production of an iron-carbon alloy of claim 1 wherein step (c) further includes simultaneously reacting carbon monoxide in the vapor space of the reactor with oxygen to form carbon dioxide and to liberate energy in the form of heat to further drive the reactions of steps (b) and (c).

3. The process for the continuous production of an iron-carbon alloy of claim 2 wherein step (c) further includes injecting oxygen into the vapor space of the reactor above the molten bath.

4. The process for the continuous production of an iron-carbon alloy of claim 3 wherein hot carbon dioxide gas generated in the vapor space of the reactor is passed out of the reactor and used to heat the solid mineral material prior to feeding the solid mineral material into the molten bath.

5. The process for the continuous production of an iron-carbon alloy of claim 2 wherein the reactor provided in step (a) further includes a feed end and an iron-carbon alloy removal end, and wherein the reaction generates an iron-carbon alloy, said process further comprising the step of simultaneously, continuously removing a portion of the iron-carbon alloy from the iron-carbon alloy removal end of the reactor.

6. The process for the continuous production of an iron-carbon alloy of claim 5, wherein the continuously removed iron-carbon alloy is further combined with alloying compounds to alter physical characteristics of the iron-carbon alloy.

7. The process for the continuous production of an iron-carbon alloy of claim 5 wherein step (b) further includes simultaneously feeding a basic oxide into the reactor which is effective to form a low viscosity, low melting point slag layer from impurities in the metallic material, and wherein a portion of the slag is continuously removed from the reactor.

8. The process for the continuous production of an iron-carbon alloy of claim 1 wherein iron carbide is substantially the sole source of carbon in the solid mineral material and wherein the weight ratio of iron carbide to iron oxide in the solid mineral material is at least about 18 or greater.

9. The process for the continuous production of an iron-carbon alloy of claim 8 wherein said process further comprises the step of simultaneously injecting oxygen into the vapor space of the reactor above the bath, wherein the oxygen reacts with the carbon monoxide in the vapor space to generate heat energy.

10. The process for the continuous production of an iron-carbon alloy of claim 9 wherein the carbon monoxide and oxygen react to form carbon dioxide which is used to preheat the solid mineral material prior to entering the molten bath of metallic material.

11. The process for the continuous production of an iron-carbon alloy of claim 1 wherein the molten bath includes two generally distinct layers, a metal layer and a slag layer, and wherein the amount of oxygen injected into the molten bath is varied along a length of the reactor from a mineral material feed end to a iron-carbon alloy removal end by using multiple injectors, such that there is an increased oxidation potential within the metal and slag layers of the molten bath at the removal end as compared to the feed end.

12. The process for the continuous production of an iron-carbon alloy of claim 11 wherein the weight ratio of iron carbide to iron oxide in the solid mineral material is sufficient to produce enough carbon monoxide when the molten metallic material is reacted with oxygen in the reactor, so that the carbon monoxide produced thereby is sufficient to supply enough heat within the enclosed reactor, when reacted with oxygen in the vapor space thereof, to cause the process to continue relatively indefinitely without the substantial addition of heat energy from an external source.

13. A process for the continuous production of an iron-carbon alloy, said process comprising the steps of:
   (a) providing reactor means for receiving and reacting mineral material in a continuous process, wherein said reactor means include an enclosed reactor capable of limiting the ingress and egress of atmospheric gases and gas reaction products, respectively, said enclosed reactor having a molten bath of metallic material and a vapor space above said molten bath to receive gaseous reaction products from said molten bath, said enclosed reactor further including a feed end and an iron-carbon alloy removal end;
   (b) continuously feeding solid mineral material into the molten bath of metallic material within the enclosed reactor such that the solid mineral material is mixed into and becomes a part of the molten bath of metallic material, wherein the solid mineral material contains both iron carbide and at least trace amounts of iron oxide, wherein the iron carbide content of the solid mineral material is at least about 85% by weight, and wherein the weight ratio of iron carbide to iron oxide in the solid mineral material is at least about 18 or greater and the iron carbide is substantially the sole source of carbon in the solid mineral material; and
   (c) simultaneously reacting the molten metallic material with oxygen at a temperature sufficient to generate carbon monoxide as a reaction product, wherein the step of reacting includes injecting oxygen into the molten bath of metallic material within the reactor to facilitate the reaction of the oxygen with carbon from the iron carbide to form carbon monoxide which subsequently enters the vapor space of the reactor above the molten bath, and wherein oxygen is simultaneously injected into the vapor space such that the oxygen in the vapor space reacts with the carbon monoxide to form carbon dioxide in an exothermic reaction.

14. The process for the continuous production of an iron-carbon alloy of claim 13 wherein the ratio of iron carbide to iron oxide is sufficient to provide an amount of iron carbide sufficient to generate an amount of carbon monoxide which is sufficient to generate an amount of heat energy when reacted with oxygen in the vapor space to continuously drive the reactions of steps (b) and (c) without a further substantial addition of heat energy from an external source.

15. The process for the continuous production of an iron-carbon alloy of claim 14 wherein said process further comprises the step of simultaneously passing hot carbon dioxide gas generated in the vapor space of the reactor out of the reactor to heat the solid mineral material prior to feeding the solid mineral material into the molten bath.

16. The process for the continuous production of an iron-carbon alloy of claim 14 wherein the reaction generates a molten iron-carbon alloy and a molten slag, respectively, said process further comprising the step of simultaneously and continuously removing a portion of the iron-carbon alloy from the iron-carbon alloy removal end of the reactor and a portion of the slag from the feed end.

17. The process for the continuous production of an iron-carbon alloy of claim 16, wherein the step of simultaneously and continuously removing a portion of the iron-carbon alloy is followed by the further step of combining an alloying compound with the iron-carbon alloy removed from the enclosed reactor to alter physical characteristics of the iron-carbon alloy.

18. The process for the continuous production of an iron-carbon alloy of claim 14 wherein step (b) further includes simultaneously feeding a basic oxide into the reactor which is effective to form a low viscosity, low melting point slag layer above the molten bath from impurities in the metallic material, wherein a portion of the slag layer is continuously removed from the feed end of the reactor.

19. The process for the continuous production of an iron-carbon alloy of claim 13 wherein the amount of oxygen injected into the molten bath is varied along a length of the reactor from the feed end to the iron-carbon alloy removal end by using multiple injectors, such that there is an increased oxidation potential within the molten bath at the removal end as compared to the feed end.

20. A process for the continuous production of an iron-carbon alloy, said process comprising the steps of:
   (a) providing reactor means for receiving and reacting mineral material in a continuous process, wherein said reactor means include an enclosed reactor capable of limiting the ingress and egress of atmospheric gases and gas reaction products, respectively, said enclosed reactor having a molten bath of metallic material and a vapor space above said molten bath to receive gaseous reaction products from said molten bath, said enclosed reactor further including a feed end and an iron-carbon alloy removal end;
   (b) continuously feeding solid mineral material into the molten bath of metallic material within the enclosed reactor such that the solid mineral material is mixed into and becomes a part of the molten bath of metallic material, wherein the solid mineral material contains at least about 60% by weight iron carbide; and
   (c) simultaneously reacting the molten metallic material with oxygen at a temperature sufficient to generate carbon monoxide as a reaction product, wherein the step of reacting includes injecting oxygen into the molten bath of metallic material within the reactor to facilitate the reaction of the oxygen with carbon from the iron carbide to form carbon monoxide which subsequently enters the vapor space of the reactor above the molten bath, and wherein oxygen is simultaneously injected into the vapor space such that the oxygen in the vapor space reacts with the carbon monoxide to form carbon dioxide in an exothermic reaction.

21. The process for the continuous production of an iron-carbon alloy of claim 20 wherein the solid mineral material contains both iron carbide and at least trace amounts of iron oxide, and wherein the weight ratio of iron carbide to iron oxide in the solid mineral material is at least about 2 or greater.

22. The process for the continuous production of an iron-carbon alloy of claim 21 wherein the content of the solid mineral material includes about 60 to about 100% by weight of iron carbide and about 0 to about 25% by weight iron oxide.

23. The process for the continuous production of an iron-carbon alloy of claim 22 wherein the ratio of iron carbide to iron oxide is sufficient to provide an amount of iron carbide sufficient to generate an amount of carbon monoxide which is sufficient to generate an amount of heat energy when reacted with oxygen in the vapor space to continuously drive the reactions of steps (b) and (c) without a further substantial addition of heat energy from an external source.

24. The process for the continuous production of an iron-carbon alloy of claim 23 wherein the weight ratio of iron carbide to iron oxide in the solid mineral material is at least about 18 or greater and the iron carbide is substantially the sole source of carbon in the solid mineral material.

25. The process for the continuous production of an iron-carbon alloy of claim 24 wherein the reaction generates an iron-carbon alloy, said process further comprising the step of simultaneously and continuously removing a portion of the iron-carbon alloy from the iron-carbon alloy removal end of the reactor; wherein the step of simultaneously and continuously removing a portion of the iron-carbon alloy is followed by the further step of combining an alloying compound with the iron-carbon alloy removed from the enclosed reactor to alter physical characteristics of the iron-carbon alloy.

26. The process for the continuous production of an iron-carbon alloy of claim 24 wherein step (b) further includes simultaneously feeding a basic oxide into the reactor which is effective to form a low viscosity, low melting point slag layer above the molten bath from impurities in the metallic material; wherein said process further comprises continuously removing at least a portion of the slag layer from the feed end of the reactor; and wherein the amount of oxygen injected into the molten bath is varied along a length of the reactor from the feed end to the iron-carbon alloy removal end by using multiple injectors, such that there is an increased oxidation potential within the molten bath at the removal end as compared to the feed end; and wherein said process further comprises the step of simultaneously passing hot carbon dioxide gas generated in the vapor space of the reactor out of the reactor to heat the solid mineral material prior to feeding the solid mineral material into the molten bath.

27. A system for the continuous production of an iron-carbon alloy, said system comprising:
(a) first reactor means for converting iron oxide to iron carbide; and
(b) second reactor means for converting iron carbide to iron-carbon alloy, wherein the iron carbide produced in said first reactor means is continuously fed into said second reactor means, wherein said second reactor means includes an enclosed reactor having enclosure means for limiting the ingress and egress of atmospheric gases and gas reaction products, respectively, said enclosed reactor having an enclosure enclosing a molten bath of metallic material and a vapor space above said molten bath to contain gaseous reaction products, said enclosed reactor further including a feed end and an iron-carbon alloy removal end from which iron-carbon alloy can be continuously removed.

28. The system for the continuous production of an iron-carbon alloy of claim 27 wherein said second reactor means further include oxygen inlet means for injecting oxygen into the molten bath and into the vapor space.

29. The system for the continuous production of an iron-carbon alloy of claim 28, said system further comprising preheater means for preheating the iron carbide, said preheating means being in communication with the vapor space of the enclosed reactor, wherein heat generated in the enclosure can be passed from the enclosure, through said preheating means to preheat the iron carbide prior to entering the enclosure.

30. The system for the continuous production of an iron-carbon alloy of claim 28, said system further comprising third reactor means, wherein the iron-carbon alloy produced in said second reactor means can be fed into said third reactor means and combined with alloying compounds to alter physical properties of the iron-carbon alloy.

* * * * *

UNITED STATES PATENT AND TRADEMARK OFFICE
CERTIFICATE OF CORRECTION

PATENT NO. : 5,139,568

DATED : August 18, 1992

INVENTOR(S) : Gordon H. Geiger

It is certified that error appears in the above-identified patent and that said Letters Patent is hereby corrected as shown below:

On the title page, Item [75], Inventor, delete middle initial "W". and insert therefor --H.--.

[56], Reference Cited, delete "4,327,540" and insert therefor --4,372,540--.

Column 7, line 61, insert --not--after "but".

Column 9, line 27, insert --50%to about--before "100%".

Column 11, line 58, section (a), delete "=" and insert therefor--.

Column 11, line 63, section (f), insert --$_2$-- after "CO".

Column 14, line 8, delete "variables" and insert therefor --varied--.

Column 14, line 60, delete "4iron" and insert therefor --4% iron--.

Column 15, line 10, insert --ed-- immediately after "discuss".

Column 15, line 12, insert --iron carbide-- immediately preceding the first comma.

Column 16, line 53, (claim 11), delete "a" before "iron-car-" and insert therefor --an--.

Signed and Sealed this

Ninth Day of March, 1993

*Attest:*

STEPHEN G. KUNIN

*Attesting Officer*   *Acting Commissioner of Patents and Trademarks*